United States Patent [19]
Del Bianco et al.

[11] Patent Number: 5,382,728
[45] Date of Patent: Jan. 17, 1995

[54] EFFECTIVE HYDROCARBON BLEND FOR REMOVING ASPHALTENES

[75] Inventors: Alberto Del Bianco, Magenta; Fabrizio Stroppa, San Giuliano Milanese, both of Italy

[73] Assignees: AGIP S.p.A.; Eniricerche S.p.A., both of Milan, Italy

[21] Appl. No.: 136,755

[22] Filed: Oct. 15, 1993

[30] Foreign Application Priority Data

Sep. 17, 1993 [IT] Italy .................. MI93 A 002008

[51] Int. Cl.⁶ ................................ C07C 15/00
[52] U.S. Cl. .................... 585/24; 585/25; 585/26
[58] Field of Search ....................... 585/24, 25, 26

[56] References Cited

U.S. PATENT DOCUMENTS 4,604,491  8/1986  Dressler et al. ............. 585/26
4,665,275  5/1987  Yoshida et al. ............. 585/26

FOREIGN PATENT DOCUMENTS 2091288  7/1982  United Kingdom ............. 585/26

OTHER PUBLICATIONS

Aldrich 1990-91 Catalog, pp. 102, 940, 1024.

Primary Examiner—Asok Pal
Attorney, Agent, or Firm—Oblon, Spivak, McClelland, Maier & Neustadt

[57] ABSTRACT

Particular hydrocarbon composition constituted by saturated species, alkylbenzenes and polyaromatics, useful for dissolving asphaltenic residues present in oil wells. Such useful hydrocarbon blends for dissolving asphaltenic residues present in oil wells, are characterized in that said blends are essentially constituted by a composition selected from those which, on a ternary chart, in which the vertex (A) represents 100% of polyaromatics with $z<-6$, the vertex (B) represents 100% of saturated species, and the vertex (C) represents 100% of alkylbenzenes with $z=-6$, are comprised between:
the vertex (A), i.e., 100% of polyaromatics with $z<-6$;
the point, along the side AB, corresponding to 77% of polyaromatics with $z<-6$ and 23% of saturated species;
the point, along the side AC, corresponding to 45% of alkylbenzenes and 55% of polyaromatics with $z<-6$;
with the further constraint that the initial boiling point of the above said hydrocarbon blend is higher than 150° C.

6 Claims, 1 Drawing Sheet

EFFECTIVE HYDROCARBON BLEND FOR REMOVING ASPHALTENES

BACKGROUND OF THE INVENTION

1. Field of the Invention

The present invention relates to a hydrocarbon blend useful for dissolving asphaltenic residues and to the process for treating, with the above said blend, the oil wells in order to remove the asphaltenic deposits.

Crude oil is a complex mixture of paraffinic, cycloparaffinic and aromatic hydrocarbons, in which components are present which have a wide range of properties: in fact, the present species range from very fluid liquids to waxy solids and very high viscosity tars.

Among the solid, or very thick, components, the asphaltenes predominate. They consist of a variable-composition mixture of fused aromatic polycyclic compounds.

Owing to the presence of various metals and heteroatoms, such as oxygen, nitrogen and sulfur, asphaltenes are among most polar components of crude oil.

In crude oil the asphaltenic particles tend to form micelles, generally of spherical shape and having a diameter comprised within the range of from 30 to 60 Angstroms, wherein the asphaltenes constitute the central core of said micelles.

Lighter aromatic compounds and polar products surround the core of the micelle, favouring the dissolution of asphaltenes in oil.

The recovery of crude oil contained in geological formations is often prevented by the presence of solid asphaltenic deposits. In fact, during the exploitation of an oil well, high molecular weight asphaltenic compounds can often precipitate together with waxy solids. These solids tend to occlude the pores of the rocky reserve of oil, and, furthermore, to block well casings, pipes and further equipment used in borehole drilling. As a consequence, the productivity of well decreases and, in extreme cases, the total loss of well production occurs.

2. Description of the Related Art

Several useful methods are known for removing the above said solid deposits, e.g., mechanical scraping, hot oil treatment, treatment with aqueous surfactant solutions. However, the most widely used technique consists in using organic solvents capable of dissolving the above said asphaltenic deposits.

For that purpose, the generally used solvents are light aromatic species, e.g., benzene, toluene and xylene.

Besides their considerably high cost, the above said solvents display very serious drawbacks, deriving from their high volatility and their low flash point. Furthermore, the above said aromatic compositions are not completely satisfactory, owing to their poor capability of dissolving the asphaltenic residues, and to the rather low kinetics of dissolution thereof.

SUMMARY OF THE INVENTION

The present invention relates to a useful blend for dissolving asphaltenic residues present in crude oil wells, which overcomes the above said drawbacks, and to the process for treating oil wells with the above said blend.

DETAILED DESCRIPTION OF THE INVENTION

Figure 1:
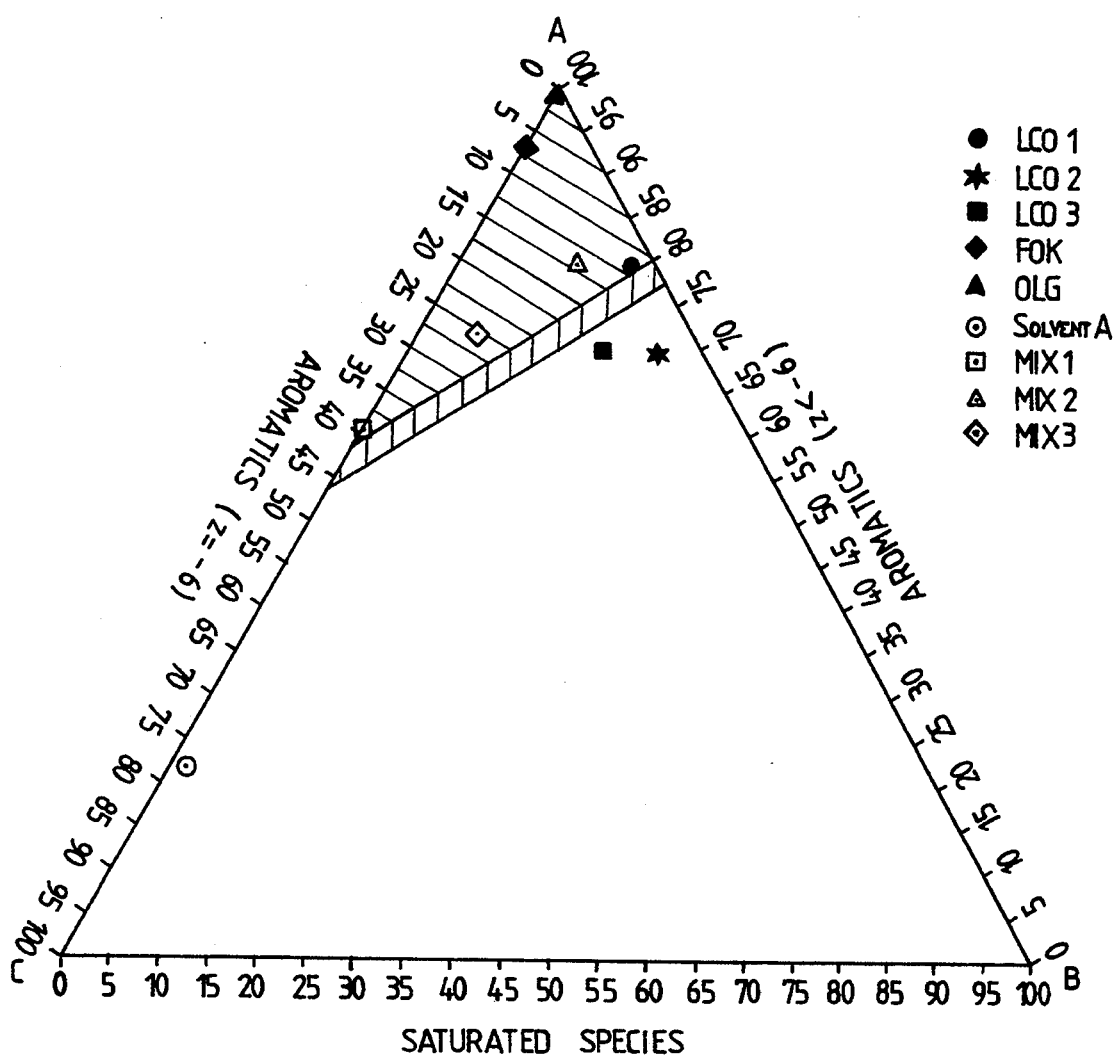
FIG. 1 is a ternary chart describing hydrocarbon compositions which are constituted by saturated species, alkylbenzenes (with $z=-6$), and polyaromatics (with $z<-6$).

The blend according to the present invention is better explained by referring to the ternary chart of FIG. 1, in which hydrocarbon compositions are represented, which are constituted by saturated species, alkylbenzenes (with $z=-6$), and polyaromatics (with $z<-6$).

The vertex (A) of the above said triangle represents 100% of polyaromatics with $z<-6$, the vertex (B) represents 100% of saturated species, and the vertex (C) represents 100% of alkylbenzenes.

In accordance therewith, a first aspect of the present invention relates to a useful hydrocarbon blend for dissolving asphaltenic residues present in oil wells, characterized in that it is essentially constituted by a composition selected from those comprised, on the ternary chart as defined hereinabove, between:

the vertex (A), i.e., 100% of polyaromatics with $z<-6$;

the point along the side AB, corresponding to 77% of polyaromatics with $z<-6$ and 23% of saturated species, preferably corresponding to 80% and 20%;

the point, along the side AC, corresponding to 45% of alkylbenzenes and 55% of polyaromatics with $z<-6$, preferably 42% and 58%;

with the further constraint that the initial boiling point of the above said hydrocarbon blend is higher than 150° C., preferably than 180° C.

The composition of the hydrocarbon blend is better explained by referring to FIG. 1, in which the set of compositions according to the present invention fall within the shaded region.

The data expressed as percent values are by weight/weight.

The parameter "z" is drawn from the general formula $C_nH_{2n+z}$, and expresses the degree of fusion/unsaturation of the hydrocarbon molecule. So, e.g., in the case of non-naphthenic saturated hydrocarbons $z=+2$, in the case of benzene and its alkyl derivatives $z=-6$, in the case of naphthenobenzenes and polyaromatics $z<-6$. For the sake of simplicity, in the following, by the expression "saturated species" all unsaturation-free hydrocarbons will be understood, including the naphthenic hydrocarbons having $z=0$ and $z=-2$; with the expression "alkylbenzenes", the aromatic hydrocarbons having $z=-6$, and with the expression "polyaromatics", those having $z<-6$ will be understood.

It is implicit as well, that the above hydrocarbon classification also contemplates heteroatoms containing hydrocarbons, in particular hydrocarbons containing oxygen, sulfur and nitrogen.

In accordance with the above, the group of saturated species comprises saturated, either linear or branched, aliphatic hydrocarbons, and naphthenes.

The group having $z=-6$, also said "of alkylbenzenes", comprises benzene and its alkyl derivatives.

The group having $z<-6$, also said "of polyaromatics", comprises naphthenobenzenes and polyaromatics in general, obviously with the relevant alkyl derivatives.

By the expression "initial boiling point", the boiling temperature at 0.5% of distillate is meant, in compliance with ASTM standard D2887.

The requisites, of the hydrocarbon blend of the present invention, can be met by some products (or byproducts) deriving from chemical or petrochemical processes, or, preferably, some distillation cuts thereof.

For example, the above said blend requisites can be met by the light cyclic oil which originates from the processes of catalytic cracking of vacuum gas oils. By "light cyclic oil", that fraction is meant which has a boiling point comprised within the range of from 200° to 350° C. However, not all light cyclic oils have such a composition as to meet the above reported constraints, with the chemical composition of the above said oils being a function of the feedstock and of the cracking conditions.

Another fraction (which is now of petrochemical origin) which can meet the above said requisites, is the gas oil cut obtained from fuel oil deriving from steam cracking ("FOK" in the following).

This fuel oil is formed with variable yields according to the cracker operating conditions, but, above all, depending on the type of feedstock. Typically, the yields of fuel oil are of 15-20% when gas oil is fed and of 2-5% when naphtha is fed. Also the chemical composition may slightly vary as a function of the above said parameters. In any cases, such a product has a minimal content of 70% of aromatics, usually comprised within the range of from 80 to 90%, as determined by column cromatography according to the ASTM standard D2549, with the balance to 100 being constituted by saturated and polar species.

The aromatic portion of FOK is constituted, to at least 75%, by aromatics and alkylaromatics containing two or more fused rings in their molecule.

The hydrocarbon blends according to the present invention display some important advantages over the blends used hitherto for dissolving the asphaltenes.

In fact, the blends according to the present invention, besides displaying an extremely good solvent power for asphaltenes, reach the saturation values within very short times.

Besides the obvious economic advantage, over such aromatic hydrocarbons as toluene and xylene, the blends according to the present invention display the advantage of being considerably higher boiling, hence with higher flash points, thereby rendering minimal any risks connected with transport and, above all, with the oil well pumping operations.

A further object of the present invention is a process for dissolving asphaltenic formations in oil wells, which consists in introducing into said oil wells a hydrocarbon blend as disclosed hereinabove.

The hydrocarbon blend, according to the present invention, is introduced into the oil wells according to usual techniques, well known to those skilled in the art. It should be observed that, usually, these techniques imply an oil well shutdown time period following the introduction of the blend selected for dissolving the asphaltenes. This non-productive time period is necessary order that the contact between asphaltenic deposits and solvent may take place. With the blend according to the present invention, this dead time is considerably reduced, because not only the blend according to the present invention displays a very high solubility for asphaltenes, but, in addition, such solubility values are reached within shorter time periods than as allowed by the traditional solvents.

The dissolution of the asphaltenic formations in the oil wells is carried out by pumping, into the formation, the composition according to the present invention.

Then, the oil well allowed to stand for a time period of a few hours, and then is purged.

The following examples are reported in order to better illustrate the present invention.

EXAMPLE 1 and COMPARISON EXAMPLES 2 AND 3

ANALYSIS OF ASPHALTENES AND HYDROCARBONACEOUS COMPOSITIONS

The residue, on which the measurements were carried out, was collected during a purging operation carried out on an oil well. Such a product was washed with refluxing n-heptane in order to remove any possibly adsorbed oil.

The above said residue shows molecular weight values, as determined via G.P.C., of Mw=1550 and Mn=1030, and has the following elemental analysis: C=84.37%; H=5.47%; N=0.80%; and S=1.86%. Furthermore, the ratio of aromatic carbon atoms to total carbon atoms is of 0.68.

Determinations were carried out on a hydrocarbon blend according to the present invention (LCO 1) and on two comparison compositions which were outside of the scope of the present invention (LCO 2 and LCO 3).

All said three compositions are light cyclic oils deriving from catalytic cracking facilities. Data relevant to their analysis are reported in Table 1.

TABLE 1

|  | LCO 1 | LCO 2 | LCO 3 |
| --- | --- | --- | --- |
| Total saturated species | 19.20 | 26.00 | 19.94 |
| Monoaromatics |  |  |  |
| alkylbenzenes | 3.56 | 4.74 | 9.94 |
| total | 9.70 | 12.14 | 19.18 |
| Total diaromatics | 51.55 | 41.14 | 40.07 |
| Triaromatics | 12.44 | 11.25 | 9.69 |
| Tetraaromatics | 0.57 | 1.18 | 1.75 |
| Pentaaromatics | 0.00 | 0.00 | 0.00 |
| Thiophenoaromatics | 6.54 | 8.29 | 9.38 |
| Total aromatics | 80.80 | 74.00 | 80.06 |

Consequently, in terms of "z", the above said fractions have the following percent composition (Table 2):

TABLE 2

| Blend | Saturated species | z = −6 | z < −6 |
| --- | --- | --- | --- |
| LCO 1 | 19.20% | 3.56% | 77.24% |
| LCO 2 | 26.00% | 4.74% | 69.26% |
| LCO 3 | 19.94% | 9.94% | 71.12% |

The distillation curves of the above said compositions are reported in following Table 3.

TABLE 3

|  | LCO 1 | LCO 2 | LCO 3 |
| --- | --- | --- | --- |
| Initial boiling point °C. | 192 | 192 | 192 |
| 5% distilled, by vol. °C. | 221 | 232 | 231 |
| 10% distilled, by vol. °C. | 238 | 247 | 246 |
| 20% distilled, by vol. °C. | 259 | 264 | 266 |
| 30% distilled, by vol. °C. | 273 | 280 | 282 |
| 40% distilled, by vol. °C. | 286 | 293 | 298 |
| 50% distilled, by vol. °C. | 300 | 306 | 311 |
| 60% distilled, by vol. °C. | 312 | 320 | 326 |
| 70% distilled, by vol. °C. | 325 | 332 | 340 |
| 80% distilled, by vol. °C. | 338 | 346 | 356 |
| 90% distilled, by vol. °C. | 354 | 365 | 376 |
| 95% distilled, by vol. °C. | 370 | 379 | 393 |
| End boiling point °C. | 404 | 407 | 427 |

As one may see from Table 3, all three LCO's have a very similar distillation curve and a same initial boiling point, but display (Tables 1 and 2) rather different compositions, above all as regards alkylbenzenes.

SOLUBILITY MEASUREMENTS

The solubility curves were obtained by preparing, for each solvent, about ten mixtures having different contents of asphaltenic deposit and measuring, by spectrophotometry, the concentration of the dissolved asphaltenic component.

In order to correctly perform the measurements, the following operations were necessary:

1. Preparation of the solutions containing a known content of asphaltenic material dissolved in order to obtain calibration straight lines as necessary in order to correlate absorbance and concentration at the three wave lengths selected in order to perform the measurements (400, 600 and 800 nm). Such solutions were prepared by starting from a mother solution obtained by filtering a mixture of approximately 100 mg of deposit in 100 ml of solvent. Inasmuch as the asphaltenic material submitted to the measurements is a compositional continuum, and therefore the spectrum at UV-visible wave lengths can be a function of the amount and of the quality of the dissolved material, the evaluation of the data relevant to the concentration of the dissolved product during the determination of the solubility curves, was obtained by calculating the average values from the absorption values measured at said three wave lengths.

The wave length range within which the measurements were carried out is the widest possible on considering the instrument limits and that under 400 nm absorptions by the solvent are possible.

In most cases taken into consideration, the calibration straight lines show a very good linearity within the examined concentration range.

By means of Linear regression calculations, it is hence possible to compute the extinction coefficients relevant to each individual wave length, which will be subsequently used in order to compute the concentrations when the solubility curves are determined.

2. Determination of the solubility curves for the evaluation of the solvent capacities, by measuring the amount of asphaltenic material dissolved by mixtures at different values of the deposit:solvent ratio.

By means of experiments, a set of mixtures was prepared which contained a known amount of deposit and increasing solvent volumes. Such mixtures were sonicated during 20 minutes and then they were kept overnight with mechanical stirring. The resulting suspension was filtered under pressure by using syringes equipped with teflon filters of 0.5 microns and on the filtrate the absorbance measurements were carried out, from which the concentrations of dissolved organic material were obtained.

The solubility data are reported in following Table 3A, in which, for comparison purposes, also some points relevant to LCO 2, LCO 3 and toluene, are reported.

TABLE 3A

| Conc. | SOLVENT | | | |
|---|---|---|---|---|
| g/l | LCO 1 | LCO 2 | LCO 3 | Toluene |
| 100 | — | — | — | 30 |

TABLE 3A-continued

| Conc. | SOLVENT | | | |
|---|---|---|---|---|
| g/l | LCO 1 | LCO 2 | LCO 3 | Toluene |
| 50 | 87.1 | — | — | 30.5 |
| 20 | 89.1 | — | — | 35.4 |
| 10 | 89.6 | — | — | 35.5 |
| 5 | 88.8 | — | — | 37.8 |
| 2 | 88.2 | — | — | — |
| 1 | 94.5 | 56.4 | 75.8 | 41.1 |
| 0.4 | 94.3 | — | — | 43.2 |

SOLUBILITY KINETICS

In these examples, the solubility kinetics are reported which were determined by measuring, at room temperature, by UV-visible absorption (400, 600 and 800 nm), the concentration of asphaltenic material dissolved from specimen (as pellets) of deposit soaked in the solvent being tested, as a function of soaking time.

The pellets are prepared by pressing an exactly weighed amount of 100 mg of sample with a Perkin-Elmer press, with a pressure of 10,000 kg/cm$^2$, in order to obtain small disks of 13 mm of diameter having a thickness of 0.7 mm. The above said pellets are then charged to the interior of a sample carrier constituted by two wire networks supported by a tripod and soaked in one litre of solvent to be studied.

The deposit:solvent ratio is such that after an infinite time the maximal solubility level allowed for each solvent should be reached (grams of deposit/litre).

During the test, the solution is kept weakly stirred by means of a magnetic anchor in order to secure the homogeneousness of the solution, with the fragmentation of the pellet being simultaneously avoided.

Table 4 reports the % values of dissolved material for dissolution kinetics (100 mg-pellet per 1 litre of solvent) for LCO 1, LCO 2 and toluene as solvents.

TABLE 4

| Time | SOLVENT | | |
|---|---|---|---|
| (hours) | LCO 1 | LCO 2 | Toluene |
| 0.5 | 7.0 | 1.9 | 7.4 |
| 1 | 11.7 | 2.3 | 10.1 |
| 2 | 23.3 | 3.0 | 12.7 |
| 4 | 45.2 | 4.3 | 15.5 |
| 8 | 86.3 | 5.8 | 18.1 |
| 24 | 99.8 | 9.6 | 21.6 |

The test result displays that the product LCO 1 is capable of dissolving more than 80% of deposit during 8 hours, i.e., within a reasonable time period for an intervention on the field.

EXAMPLE 4 and 5

Example 4 relates to a gas wash oil (OLG), which consists of a distillate obtained from coke-oven tar distillation. Example 5 relates to a gas oil fraction from steam cracking fuel oil (FOK).

The above said two hydrocarbon compositions have the following distillation curves (Table 5).

TABLE 5

| | OLG | FOK |
|---|---|---|
| Initial boiling point °C. | 199 | 194 |
| 5% distilled, by vol. °C. | 215 | 204 |
| 10% distilled, by vol. °C. | 222 | 218 |
| 20% distilled, by vol. °C. | 231 | 240 |
| 30% distilled, by vol. °C. | 236 | 248 |

TABLE 5-continued

| | OLG | FOK |
|---|---|---|
| 40% distilled, by vol. °C. | 242 | 256 |
| 50% distilled, by vol. °C. | 253 | 264 |
| 60% distilled, by vol. °C. | 264 | 279 |
| 70% distilled, by vol. °C. | 272 | 289 |
| 80% distilled, by vol. °C. | 278 | 299 |
| 90% distilled, by vol. °C. | 292 | 314 |
| 95% distilled, by vol. °C. | 299 | 317 |
| End boiling point °C. | 327 | 387 |

In terms of chemical composition, both said mixtures are constituted as follows:

*OLG: saturated species: none; $z = -6$: 1.3%; $z < -6$: 98.7%.

*FOK: saturated species: none; $z = -6$: 6.80%; $z < -6$: 93.20%.

The solubility of asphaltenes as described in the preceding examples, in the above said solvents results to be, for both of them, of 95%.

EXAMPLE 6-9

In these examples, the dissolving properties, of some blends having different compositions, are reported. Some of the above said blends have a composition falling within the scope of the present invention (MIX 1, 2, 3), one of them is outside of it (Solvent A), Also in this case, it is demonstrated that the blends according to the present invention are capable of dissolving large amounts of asphaltenes, whilst, on the contrary, the Solvent A, having a composition which is outside of the scope of the present invention, displays a poor dissolving power for asphaltenes.

The compositions of the above said blends, and the solubilities of asphaltenes in said blends, are reported in Table 6 and in FIG. 1 (all data are expressed as percent values by weight, at concentrations of 1 g of deposit/solvent per litre).

TABLE 6

| | COMPOSITION | | | |
|---|---|---|---|---|
| SOLVENT | Saturated species | $z = -6$ | $z < -6$ | SOLUBILITY |
| MIX 1 | 0.6 | 39.4 | 60.0 | 91.0 |
| MIX 2 | 12.0 | 8.4 | 79.6 | 93.0 |
| MIX 3 | 6.2 | 21.8 | 72.0 | 92.0 |
| Solvent A | 1.1 | 77.5 | 21.4 | 46.0 |

We claim:
1. A hydrocarbon blend for dissolving asphaltenic residues present in oil wells, consisting essentially of a composition selected from compositions on a ternary chart, in which the vertex (A) represents 100% by weight of polyaromatics with $z < -6$, the vertex (B) represents 100% by weight of saturated species, and the vertex (C) represents 100% by weight of alkylbenzenes with $z = -6$, between points corresponding to:
   (i) 100 weight % polyaromatics;
   (ii) 77 weight % polyaromatics, and 23 weight % of saturated species; and
   (iii) 55 weight % of polyaromatics, and 45 weight % of alkylbenzenes;
   wherein the initial boiling point of said hydrocarbon blend is higher than 150° C., and
   said hydrocarbon blend comprises at least two members selected from the group consisting of polyaromatics, alkylbenzenes and saturated species.

2. Hydrocarbon blend according to claim 1, characterized in that its initial boiling point is higher than 180° C.

3. The hydrocarbon blend of claim 1, wherein said composition is selected from those compositions between points corresponding to:
   (i) 100 weight % of polyaromatics;
   (ii) 80 weight % of polyaromatics, and 20 weight % of saturated species;
   (iii) 58 weight % of polyaromatics, and 42 weight % of alkylbenzenes.

4. The hydrocarbon blend of claim 1, wherein the initial boiling point of said hydrocarbon blend is in the range from 150° to 210° C.

5. The hydrocarbon blend of claim 3, wherein the initial boiling point of said hydrocarbon blend is in the range from 150° to 210° C.

6. The hydrocarbon blend of claim 3, characterized in that its initial boiling point is higher than 180° C.

* * * * *